T. A. WEAVER.
NUT LOCK.
APPLICATION FILED JULY 12, 1921.
1,413,548. Patented Apr. 18, 1922.
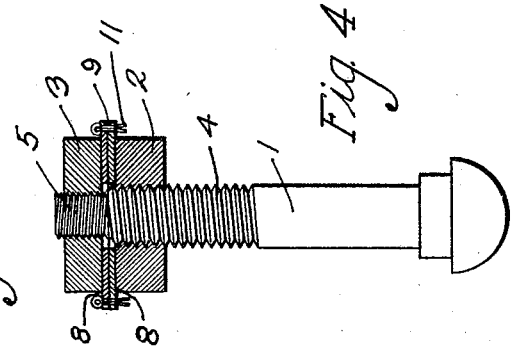
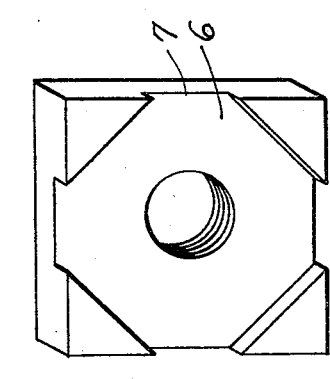
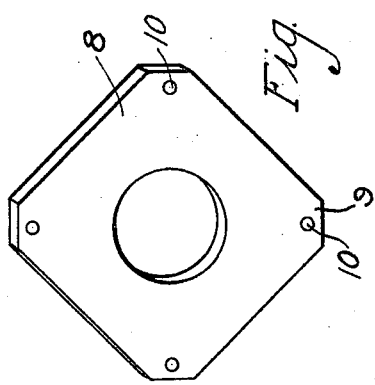
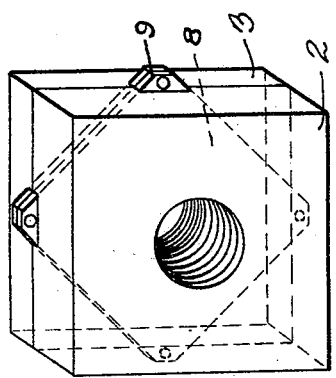
Theodore A. Weaver INVENTOR
BY
D. Whistler ATTORNEY

UNITED STATES PATENT OFFICE.

THEODORE A. WEAVER, OF MIAMISBURG, OHIO.

NUT LOCK.

1,413,548. Specification of Letters Patent. Patented Apr. 18, 1922.

Application filed July 12, 1921. Serial No. 484,272.

*To all whom it may concern:*

Be it known that I, THEODORE A. WEAVER, a citizen of the United States, residing in Miamisburg, in the county of Montgomery and State of Ohio, have invented certain new and useful Improvements in Nut Locks, of which the following is a specification, reference being had therein to the accompanying drawings.

This invention relates to nut locks, the main object of the invention being to provide an improved nut lock which is cheap to manufacture, easy to apply and remove on a bolt, and which will be positive under all conditions of use in holding the nut in its adjusted position.

In the accompanying drawings:

Fig. 1 is a perspective view of my improved nut lock and nuts detached from the bolt;

Fig. 2 is a detail inside view of one of the nut sections;

Fig. 3 is a detail view of one of the nut lock washers, and

Fig. 4 is a view illustrating the nut lock and nuts applied to a bolt, the nuts and lock washers being in sectional view.

A feature of the invention consists in using but few parts in the complete assembly of the nut lock, the device as a whole being symmetrical, and the parts to some extent interchangeable one with another.

A bolt —1, and a divided nut, comprising a lower section —2 and an upper section —3 are here shown to illustrate the invention, the bolt being a standard car bolt except as to its threaded end, the lower portion —4 of which being a coarse right hand thread, as here shown, and the upper portion —5 being reduced in diameter and having a finer left hand thread, the half nuts —2 and —3 being threaded oppositely accordingly to fit the bolt,—the contacting faces of the nuts —2 and —3 coming flush one with the other.

The inner face of each half nut —2 and —3 has a rectangular-shaped depression —6 formed therein, each depression —6 being open to the four sides of the nut as at —7, and each adapted to receive a lock washer —8, the opposite lock washers being interchangeable one with the other, and having the corners —9 thereof projecting outwardly through the openings, —7,—apertures 10 being provided in the washers and adapted to register one aperture with another in the opposite washers, and to have a retaining element as a cotter pin —11 inserted therein to secure one washer to the other as illustrated in Fig. 4.

As best illustrated in Fig. 1 of the drawings, the complete assembly of the nut lock constitutes a symmetrical device,—the sides of nuts —2 and —3 being parallel one with the other, their inner faces contacting, flush one with the other, and the lock washers —8 having their outer faces flush with the inner faces of the nuts and the apertures —10 in the opposite washers adapted to register and receive the pin —9 on each quarter turn of one washer relative to the other,—the nut being thus adapted for close adjustment on the bolt.

Having described my invention, I claim:

1. In a device of the character described, the combination with a bolt having right and left hand threads one outward of the other, of a nut threaded to fit the lower threads and having a depression formed in its upper face and open to the sides of the nut, a lock washer in said depression flush with the face of the nut, and portions thereof projecting outwardly of the nut through said openings, a nut threaded to fit the upper threads and having a corresponding depression and openings formed in its lower face, and having a corresponding lock washer therein, and means in the projecting portions of the lock washers to secure one washer to the other when said nuts are threaded on the bolt.

2. In a device of the character described, the combination with a bolt having its end reduced in diameter and threaded, and a portion adjacent said end threaded inversely thereto, of opposite nuts threaded inversely one to the other and adapted to be secured respectively to said threaded portions of the bolt, and each having a depression formed in its inner face and open to the sides of the nut, and a lock washer in each of said depressions having a portion projecting through said opening, one washer being superposed on the other washer and adapted to be aligned and secured therewith.

3. In a device of the character described, the combination with a bolt having counteracting right and left hand threads, of opposite nuts threaded inversely one to the other, adapted to be adjusted on said bolt, and each having a depression formed in the inner face thereof and open to the four sides of the nut, said depressions being adapted to register one with the other when said nuts are adjusted on the bolt and interchangeable lock washers adapted to be superposed between the nuts in said depression, portions of each washer projecting outwardly of the nuts through said openings, and means in the projecting portions of the washers adapted to be aligned and secured one with the other.

In testimony whereof, I affix my signature.

THEODORE A. WEAVER.